United States Patent [19]

Henning et al.

[11] Patent Number: 4,870,129
[45] Date of Patent: Sep. 26, 1989

[54] ADHESIVE AND USE OF THE ADHESIVE FOR THE FORMATION OF BONDS

[75] Inventors: Wolfgang Henning, Kuerten; Rudolf Hombach, Leverkusen; Walter Meckel, Neuss; Manfred Dollhausen, Odenthal, all of Fed. Rep. of Germany

[73] Assignee: Bayer Aktiengesellschaft, Leverkusen, Fed. Rep. of Germany

[21] Appl. No.: 87,542

[22] Filed: Aug. 19, 1987

[30] Foreign Application Priority Data

Sep. 4, 1986 [DE] Fed. Rep. of Germany ....... 3630045

[51] Int. Cl.$^4$ .................... C08L 75/06; C08K 3/20; C08G 18/75
[52] U.S. Cl. ............................. 524/597; 156/331.7; 524/839; 524/840
[58] Field of Search .................. 524/839, 840, 591; 156/331.7

[56] References Cited

U.S. PATENT DOCUMENTS

| | | | |
|---|---|---|---|
| 3,036,998 | 5/1962 | Rudner | 260/77.5 |
| 3,461,103 | 8/1969 | Keberle et al. | 260/75 |
| 3,479,310 | 11/1969 | Dieterich et al. | 260/29.2 |
| 3,480,592 | 11/1969 | Dieterich et al. | 260/77.5 |
| 3,686,108 | 8/1972 | Reiff et al. | 260/29.2 |
| 3,756,992 | 9/1973 | Dieterich | 260/77.5 |
| 4,056,564 | 11/1977 | Wolf et al. | 260/512 |
| 4,108,814 | 8/1978 | Reiff et al. | 260/29.2 |
| 4,192,937 | 3/1980 | Noll et al. | 528/59 |
| 4,237,264 | 12/1980 | Noll et al. | 528/67 |
| 4,269,748 | 5/1981 | Nachtkamp et al. | 260/29.2 |
| 4,292,226 | 9/1981 | Wenzel et al. | 260/29.2 |
| 4,594,385 | 6/1986 | Thoma et al. | 524/839 |
| 4,623,416 | 11/1986 | Henning et al. | 156/331.7 |

FOREIGN PATENT DOCUMENTS

| | | |
|---|---|---|
| 1129128 | 8/1982 | Canada . |
| 0164547 | 4/1985 | European Pat. Off. . |
| 0192946 | 1/1986 | European Pat. Off. . |
| 880485 | 6/1953 | Fed. Rep. of Germany . |
| 1044404 | 11/1958 | Fed. Rep. of Germany . |
| 1134946 | 8/1962 | Fed. Rep. of Germany . |
| 2804609 | 8/1979 | Fed. Rep. of Germany . |
| 1081705 | 8/1967 | United Kingdom . |
| 1148244 | 4/1969 | United Kingdom . |
| 1191260 | 5/1970 | United Kingdom . |
| 1336050 | 11/1973 | United Kingdom . |
| 1584865 | 2/1981 | United Kingdom . |

OTHER PUBLICATIONS

Angewandte Chemie 82, 53 (1970) English version pp. 40–50.

Primary Examiner—C. Warren Ivy
Attorney, Agent, or Firm—Gene Harsh; Joseph C. Gil; Aron Preis

[57] ABSTRACT

An adhesive consisting substantially of an aqueous solution or dispersion of a polyurethane containing chemically incorporated carboxylate and/or sulphonate groups is prepared from a mixture of at least two (cyclo)-aliphatic diisocyanate and selected polyester diols based on (i) adipic acid and (ii) tetramethylenediol, hexamethylenediol or mixtures of these diols. The use of such aqueous solutions for the formation of bonds on any substrates, in particular on leather, plastics, rubber materials and/or polyvinyl chloride containing plasticizer, with the same material or with other materials is disclosed.

2 Claims, No Drawings

ADHESIVE AND USE OF THE ADHESIVE FOR THE FORMATION OF BONDS

FIELD OF THE INVENTION

The present invention relates to an adhesive based on an aqueous solution or dispersion of an anionically modified polyurethane and the use of such a solution or dispersion for the formation of bonds on any substrates.

BACKGROUND OF THE INVENTION

Aqueous solutions and dispersions of polyurethane and polyurethane-polyureas are known. Their preparation has been described, for example, in the following documents: DE-PS No. 880,485, DE-AS Nos. 1,044,404, US-PS 3,036,998, DE-PS 1,178,586, DE-PS 1,134,946, DE-AS 1,237,306, DE-OS 1,595,602, US-PS Nos. 3,756,992, DE-OS 2,019,324, DE-OS 2,035,732, DE-OS Nos. 2,446,440, DE-OS 2,651 506, US-PS 3,479,310 and Angewandte Chemie 82, 53(1970). The known aqueous solutions and dispersions are suitable for various applications, including the formation of bonds on any substrates.

When these dispersions are used for bonding non-absorbent substrates such as rubber, metal or soft PVC, the heat activation process is employed to prevent the inclusion of water. In this process, the dispersion adhesive is applied to the substrate and after complete evaporation of water the layer of adhesive applied is converted into an adhesive state by the action of heat.

One major disadvantage of the dispersions known in the art is that the temperature required for activating the adhesive layer is so high that it frequently damages the substrate. Thus, for example, molded shoe soles of thermoplastic rubber cannot be satisfactorily bonded with presently available polyurethane dispersions since the temperatures required for activating the layer of adhesive cause deformation of the material of the shoe sole.

Attempts to reduce the activation temperature by the addition of solvents, plasticizers or resins resulted in an undesirable loss of heat strength of the bonds.

DE-OS No. 2,804,609 (=EP-B-No. 0,003,521) describes the use of adhesives consisting of polyurethane dispersions obtained from polyurethanes which have been prepared from aliphatic diisocyanates. Although these adhesives form readily activated layers of adhesive, the dispersions do not dry uniformly at room temperature but form scales, i.e. they do not cohere. This causes a severe drop in adhesive strength, especially after prolonged action of moisture. It was therefore an object of the present invention to provide a new adhesive based on an aqueous solution or dispersion of a polyurethane which would not have the disadvantages mentioned above.

DETAILED DESCRIPTION OF THE INVENTION

It was surprisingly found that this problem could be solved by means of the adhesive according to the invention described below. The adhesive according to this invention is based on water-soluble or water-dispersible polyurethanes which have been prepared from selected polyester diols of the kind described below and mixtures of at least two (cyclo)aliphatic diisocyanates and which are otherwise virtually free from built-in ethylene oxide units situated in polyether end chains or side chains. The adhesives according to the invention are suitable for the preparation of readily activated adhesive layers and the bonds obtained have heat strength values even higher than those required in practice and sometimes even higher than those of bonds based on comparable adhesives containing solvents.

The present invention relates to an adhesive comprising an aqueous solution or dispersion of a polyurethane containing from 2 to 200 milliequivalents of chemically built in carboxylate and/or sulphonate groups per 100 g of solids content, which polyurethane is based on
(a) organic diisocyanates,
(b) organic dihydroxy compounds having a molecular weight in the range of from 400 to 10,000,
(c) optionally polyhydric alcohols and/or amino alcohols having a molecular weight in the range of from 62 to 399 in a quantity of from 0 to 40 equivalents percent, based on the total quantity of components (b) and (c), and
(d) aminic or hydrazinic chain lengthening agents having a molecular weight in the range of from 32 to 400, characterized in that said organic diisocyanates are a mixture of at least two different (cyclo)aliphatic diisocyanates, each in a quantity of at least 10 mol %, based on the total quantity of diisocyanates, and that component (b) consists substantially of polyester diols hexamethylenediol or a mixture of these diols.

The invention also relates to a method of use of aqueous solutions or dispersions of polyurethanes containing from 2 to 200 milliequivalents of chemically built in carboxylate and/or sulphonate groups per 100 g of solids content and prepared by the reaction of
(a) organic diisocyanates with
(b) organic polyhydroxyl compounds having a molecular weight in the range of 400 to 10,000 and
(c) optionally polyhydric alcohols and/or amino alcohols in the molecular weight range of from 62 to 399 used in a quantity of 0 to 40 equivalents percent, based on the total quantity of components (b) and (c),
at an NCO/OH equivalent ratio in the range of from 1.2:1 to 2.5:1, followed by chain lengthening of the resulting prepolymers containing isocyanate groups with
(d) aminic or hydrazinic chain lengthening agents, preferably using an NCO/NH equivalent ratio of from 1:0.2 to 1:1.1,
which solutions or dispersions optionally contain auxiliary agents and additives known in the technology of adhesives, as adhesive for the formation of bonds on any substrates, in particular on leather, rubber materials, plastics and/or polyvinyl chloride containing plasticizers, the bonds being formed either to the same material as the substrate or to other materials, characterized in that
(a) the organic diisocyanates consist of a mixture of at least two different (cyclo)aliphatic diisocyanates, each in a quantity of at least 10 mol %, based on the total quantity of component (a), and
(b) the organic polyhydroxyl compounds consist substantially of polyester diols obtained from (i) adipic acid and (ii) tetramethylenediol, hexamethylenediol or a mixture of these diols.

Although the preparation of an aqueous polyurethane dispersion using two different (cyclo)aliphatic diisocyanates has already been described in DE-OS No. 2,651,506 (in particular Example 1), the polyester diol used for that method of preparation is one which contains dimethylolpropane-1,3-diol as starting component.

Moreover, a monohydric polyether alcohol is used for the introduction of hydrophilic ethylene oxide units. It is further stated in that publication that the dispersions are suitable for use as adhesives. It has now been found, however, that dispersions which have been prepared from the above-mentioned starting materials used in Example 1 of DE-OS No. 2,651,506 are much less suitable for use as adhesives than the dispersion adhesives according to the present invention—see comparative Example 1f below—which have been prepared from selected polyesterdiols of the type mentioned under (b) and the hydrophilic character of which may be attributed virtually entirely to the presence of ionic centers.

In the context of the present invention, the term "polyurethane" also covers polyurethane-polyureas, i.e. high molecular weight compounds which contain urea groups in addition to urethane groups.

The use of mixtures of different isocyanates in the preparation of polyurethanes in order to obtain special properties is known and has also been described in DE-OS No. 2,645,779. According to said prior publication, combinations of (i) aliphatic or cycloaliphatic diisocyanates and (ii aromatic diisocyanates are used for the preparation or water-dispersible polyurethanes. Dispersions of this kind are, however, unsuitable for solving the problem underlying the present invention since the light-fastness of the polyurethanes is insufficient due to the use of high proportions of aromatic diisocyanates, with the result that the polyurethanes are then unsuitable for many purposes, for example, for bonding shoe sole materials which are light in color. Moreover, it is not possible to lower the activation temperature of the adhesive layer when such diisocyanate mixtures are used.

The adhesive according to the present invention comprises an aqueous solution or dispersion of a polyurethane. The adhesive may contain the usual auxiliary agents and additives used in the technology of adhesives in addition to this main component.

Suitable diisocyanates (a) for the preparation of the polyurethane include, for example, those corresponding to the general formula Q(NCO)$_2$ in which Q denotes a divalent aliphatic hydrocarbon group with 4–12 carbon atoms or a divalent cycloaliphatic hydrocarbon group with 6–15 carbon atoms. When used in the context of this invention, the term "cycloaliphatic hydrocarbon group" also includes aliphaticcycloaliphatic hydro-carbon groups such as those obtained, for example, by removal of the isocyanate groups from 1-isocyanato-3,3,5-trimethyl-5-isocyanatomethylcyclohexane or similar aliphatic cycloaliphatic diisocyanates. The term "cycloaliphatic diisocyanate" is therefore used not only for true cycloaliphatic diisocyanates but also for such aliphatic-cycloaliphatic diisocyanates.

The following are specific examples of suitable diisocyanates (a): 1,4-diisocyanatobutane, 1,6-diisocyanatohexane, 1,12-diisocyanatododecane, 1,4-diisocyanatocyclohexane, 1-isocyanato-3,3,5-trimethyl-5-isocyanatomethyl-cyclohexane, (IPDI), 4,4'-diisocyanatodicyclohexylmethane and 4,4'-diisocyanatodicyclohexylpropane-(2,2).

It is an essential feature of this invention that the diisocyanatic component (a) used for the preparation of the polyurethane dissolved or dispersed in water contain at least two such diisocyanates and that they are present in a quantity of at least 10 mol-% each, preferably at least 20 mol-% each and most preferably at least 30 mol-% each based on the total quantity of component (a). Mixtures of more than two different diisocyanates may be used, in which case the third diisocyanate, for example, may be present in the mixture in a quantity of less than 10 mol-%, in accordance with the conditions stipulated above. The diisocyanate components preferably consist of mixtures of at least one aliphatic diisocyanate present in the given minimum quantity with at least one cycloaliphatic diisocyanate present in the given minimum quantity. Mixtures of 1,6-diisocyanatohexane and IPDI are particularly preferred.

The following are among the components to be reacted with isocyanate component (a):

(b) Dihydroxypolyesters in the molecular weight range of 400 to 10,000, preferably 400 to 5000, mainly based on (i) adipic acid and (ii) tetramethylenediol, hexamethylenediol or mixtures of these diols.

The following starting components are optionally also used:

(c) Polyhydric alcohols, in particular dihydric alcohols in the molecular weight range of from 62 to 399, in particular the corresponding alkane polyols such as ethylene glycol, propylene glycol, tetramethylene diol, hexamethylenediol, glycerol, trimethylolpropane or trimethylolethane or low molecular weight alcohols containing ether groups, e.g. diethyleneglycol, triethyleneglycol, dipropyleneglycol or tripropyleneglycol, or amino alcohols in the molecular weight range of from 61 to 399, e.g. ethanolamine, propanolamine diethanolamine or dipropanolamine. The use of compounds which are trifunctional in isocyanate addition reactions, such as the last two amino alcohols mentioned, is, however, less preferred as it would lead to unwanted branching of the molecule although the inclusion of small quantities of such trifunctional components may be considered. Any mixtures of the exemplified alcohols may be used in the process according to the invention.

The starting components (c) are used, if at all, in a quantity of up to 40 equivalents percent, based on the total quantity of components (b) and (c). The figures given for the equivalents percent refer to the isocyanate reactive groups present in components (b) and (c), primary amino groups being counted as monofunctional groups, as also in component (d).

Aminic or hydrazinic chain lengthening agents (d) are used for the preparation of the polyurethane on which the adhesive coating according to the invention is based. These chain lengthening agents are compounds in the molecular weight range of from 32 to 400 containing at least two aminic or hydrazinic amino groups, e.g. ethylene diamine, hexamethylene diamine, isophorone diamine, 2,4-diaminotoluene, 4,4'-diaminodiphenylmethane, 4,4'-diamino-dicyclohexylmethane, diethylenetriamine, triethylene-tetramine, hydrazine and hydrazine hydrate. These starting components may also be used in a masked form, e.g. in the form of the corresponding ketimines or ketazines (reaction products with simple ketones such as acetone, methyl ethyl ketone or methyl isobutyl ketone). When such masked chain lengthening inactive until released by the hydrolytic action of water.

The polyurethane which forms the basis of the adhesive according to this invention contains, based on the solids content, 2 to 200 milliequivalents, preferably 2 to 150 and most preferably 5 to 100 milliequivalents of carboxylate and/or sulphonate groups per 100 g of solids content. Such ionic centers may be built into the molecule in known manner by means of starting components containing ionic groups (carboxylate and/or sulphonate groups) or potential ionic groups (carboxylic acid and/or sulphonic acid groups). When compounds containing potential ionic groups of this kind are used, the potential ionic groups are at least partly converted into the corresponding ionic groups either before or while the polyurethane is mixed with water for the preparation of the solution or dispersion, for example by means of tertiary amines such as triethylamine or inorganic bases such as sodium hydroxide solution. If, for example, carboxyl groups incorporated in the molecule are only partially neutralized then the polyurethanes contain free carboxyl groups which in many cases increase the adhesive power.

Anionic or potentially anionic starting components include, for example, aliphatic diols containing sulphonate groups according to DE-OS No. 2,446,440 or DE-OS No. 2,437,218, diols and/or diaminosulphonates containing carboxylate groups or groups capable of being converted into carboxylate groups as described in CA-PS 928,323, e.g. the sodium salt of N-(2-aminoethyl)-2-aminoethane sulphonic acid, dimethylolpropionic acid or salts thereof, for example the corresponding triethylammonium salt, or the sodium salt of N-(2-aminoethyl)-Z-aminopropionic acid.

Depending on the nature of the isocyanate reactive groups (hydroxyl or amino groups) and on the molecular weight of these (potentially) anionic starting components, the said starting components may constitute part of component (b) ((potentially) anionic polyhydroxyl compounds in the molecular weight range of from 400 to 10,000), of component (c) ((potentially) anionic low molecular weight polyhydroxyl compounds) or of component (d) (anionic aminic chain lengthening agents). For the preparation of the polyurethanes, it is to a large extent immaterial whether the ionic groups are incorporated by means of starting components (b), (c) and/or (d).

The quantity of anionic groups used in the preparation of the polyurethanes is always calculated to ensure the solubility or dispersibility of the polyurethanes in water. External emulsifiers could in principle be used but are by no means preferred. Emulsifiers which could be used are, for example, ethoxylated nonylphenol, polyoxyethylene lauryl ether and the laurate, oleate or stearate of polyoxyethylene. These additives generally have 8 to 50 polyoxyethylene units per molecule. When such external emulsifiers are used, they may be added to the polyurethanes to be dispersed or to isocyanate prepolymers before dispersion take place.

Solvents may be used for the preparation of the polyurethanes. They are preferably organic solvents with boiling points below 100° C. at normal pressure. Examples include benzene, ethyl acetate, acetone, methyl ethyl ketone, diethylether, tetrahydrofuran, methyl acetate, acetonitrile, chloroform, methylene chloride, carbon tetrachloride, 1,2-dichloroethane, 1,1,2-trichloroethane and tetrachloroethylene. Water-miscible solvents are preferred, especially acetone.

The polyurethanes are prepared by the well-known methods used for preparing aqueous polyurethane dispersions and solutions. This means that the polyurethane molecule is either synthesized at least partly in the presence of water so that an aqueous solution or dispersion is obtained directly or the process according to the invention is carried out anhydrously until the macromolecule has been built up, whereupon the polyurethane is converted into an aqueous solution or dispersion in a known manner.

In either case, the above-mentioned starting components are used in such quantities for the preparation of the polyurethane solution or dispersion that the equivalent ratio of all the isocyanate groups taking part in the synthesis to all the isocyanate reactive groups taking part in the synthesis with the exclusion of any water already present in the process of preparation of the polyurethane lies in the range of from 2.5:1 to 0.7:1, preferably from 2:1 to 1.2:1. When a large excess of isocyanate is used, this method results in isocyanate prepolymers which undergo chain lengthening by reacting with the water used as solvent or dispersing medium.

The process according to the invention is preferably carried out by one of the following variations:

1. By the "acetone process", a prepolymer containing isocyanate end groups is prepared solventfree or in the presence of solvents of the type exemplified above by analogy with the teaching according to DE-OS No. 1,495,745 (=U.S. Pat. No. 3,479,310) or DE-OS No. 1,495,847 (=GB-PS No. 1,076,788). The starting materials used in this process are diisocyanate mixtures of the type mentioned under (a), relatively high molecular weight polyhydroxyl compounds of the type mentioned under (b), optionally chain lengthening agents of the type exemplified under (c) and of the type exemplified under (d) and ionic starting components of the type exemplified above or the corresponding potentially ionic starting components. This procedure, carried out with an equivalent ratio of isocyanate groups to isocyanate reactive groups in the region of 1.2:1 to 2.5:1, generally results in the formation of an isocyanate prepolymer from components (a), (b) and optionally (c), and this prepolymer is then dissolved in a suitable solvent, whereupon it undergoes the chain lengthening reaction with component (d) in solution to form the polyurethane. The incorporation of ionic groups takes place during the preparation of the prepolymer by using suitable ionic or potentially ionic starting components (b) and/or (c) containing hydroxyl (d) containing ionic groups or potentially ionic anionic groups which are converted into ionic groups before or during the dispersion in water. Difunctional starting components of the type exemplified above are preferably used for this embodiment. The equivalent ratio of isocyanate groups in the prepolymer to isocyanate reactive groups in component (d) is in this case generally in the range of from 1:0.2 to 1:1.1, preferably from 1:0.5 to 1:0.9. The solution of the resulting polyurethane is then mixed with water which may contain neutralizing agents of the type exemplified above for neutralizing any potentially ionic groups present. If desired, the solvent may be distilled off from the aqueous polyurethane dispersion obtained after the polyurethane has been mixed with water.

2. Another embodiment of the process of preparation of the aqueous polyurethane dispersions is similar to the method disclosed in DE-OS No. 2,725,589, U.S. Pat. Nos. 4,269,748, 4,192,937 or 4,292,226, in which masked chain lengthening agents of the type mentioned under (d) are used. According to this embodiment, isocyanate prepolymers previously prepared in solution or solventfree from the starting materials (a), (b) and optionally (c) exemplified above together with (potentially) anionic starting components of the type mentioned above, using an equivalent ratio of isocyanate groups to isocyanate reactive groups in the range of from 1.2:1 to 2.5:1, are mixed with the above mentioned masked chain lengthening agents in the quantity mentioned under 1., and water is then added to the resulting mixture, whereby the previously masked amine or hydrazine is released and reacts as chain lengthening agent for the prepolymer. The water used in this method may contain the neutralizing agent in solution for any potentially ionic groups present.

This method of preparing the polyurethane dispersions may also be modified in accordance with the teaching of U.S. Pat. Nos. 4,192,937 or of 4,292,226 to the effect that oxazolidines or amine salts are used as potential chain-lengthening agents instead of the above-mentioned masked chain lengthening agents (d). Such a procedure, however, is less preferred.

In another embodiment of the process according to the invention, isocyanate-containing prepolymers of the type mentioned under 1 and 2 above are first dispersed in water which may contain the neutralizing agent required for neutralizing any potentially ionic groups present, and the resulting aqueous dispersion is then mixed with an aminic or hydrazinic chain lengthening or cross-linking agent of the type mentioned under (d) containing free amino groups, the components being mixed in the proportions required for an NCO/NH equivalent ratio in the range of from 1:0.2 to 1:1.1, preferably from 1:0.3 to 1:0.98. The chain lengthening reaction is then carried out at temperatures from 5 to 90° C., preferably at temperatures up to 80° C.

It would be possible in principle to prepare aqueous polyurethane solutions or dispersions of the type present in the adhesives according to the invention by the method according to U.S. Pat. No. 3,756,992, i.e. by the "melt dispersion process". In this process, hydrophilically modified prepolymers of the type already mentioned under 1 and 2 are converted into acylated amines in a solvent-free reaction mixture with urea, ammonia or other suitable compounds, and these acylated amines are converted into compounds containing methylol groups by a reaction with formaldehyde before, during or after the addition of water. The methylol-containing products dispersed or dissolved in water may then be converted into high molecular weight polyurethanes, for example by heating to 50°-150° C., which results in a condensation reaction of the reactive methylol groups. This method of preparing polyurethane solutions or dispersions is, however, less preferred. It is particularly advantageous to prepare the polyurethane solutions or dispersions of the adhesives according to the invention by the method given under 1 above.

The quantity of water used for the preparation of the aqueous polyurethane solutions or dispersions is calculated to give rise to concentrations of 10 to 60% by weight, preferably 20 to 50% by weight. The usual auxiliary agents and additives may be added to the solutions or dispersions, e.g. those described in U.S. Pat. No. 3,479,310, column 8, line 40, column 9, line 10.

A solvent such as acetone or methyl ethyl ketone may be added to adjust the solution or dispersion to a suitable viscosity.

Natural or synthetic resins such as phenol resins, ketone resins, colophony derivatives, phthalate resins, acetyl cellulose or nitrocellulose or other substances, e.g. silicate fillers, may be added to the adhesives to impart special properties to them, e.g. to lengthen the contact bonding time.

The adhesives according to this invention, which comprise polyurethane solutions or dispersions described above and optionally contain auxiliary agents of the type exemplified are suitable for bonding any substrates, e.g. paper, cardboard, wood, metal or leather, but are particularly suitable for bonding rubber materials or plastics, including polyurethane foams having a compact surface and, provided the reaction mixture used for the preparation of the polyurethane conforms in its special composition to DE-PS No. 1,256,822, they are also particularly suitable for bonding homopolymers or copolymers of vinyl chloride containing plasticizers, especially for bonding shoe soles made of these materials and shoe uppers made of leather or synthetic leather.

The adhesive according to the invention is worked up by the known methods of adhesive technology used for working up aqueous dispersion or solution adhesives.

The examples given below serve to further illustrate the invention. "Milliequivalents percent" means milliequivalents per 100 g of solids.

The technical data of the adhesives are summarized in a Table at the end of the experimental part.

The invention is further illustrated, but is not intended to be limited by the following examples in which all parts and percentages are by weight unless otherwise specified.

EXAMPLES

Bonds were produced by means of the adhesives described below (Examples 1 to 4). The material to be bonded was a PVC material 4 mm in thickness containing 30% of dioctyl phthalate as plasticizer. The surfaces to be bonded together were vigorously rubbed down with a sanding belt of grain 40 before the adhesives were applied. After removal of the grinding dust, the materials were coated with a 0.1 mm layer of adhesive and ventilated for about 30 minutes at room temperature.

Assessment of film formation

After ventilation, the adhesive film obtained was examined optically to determine whether it was uniform and homogeneous or whether it was inhomogeneous and formed scales on drying.

Determination of the activation temperature

To determine the activation temperature, sample strips 1 cm in width were kept in a drying cupboard at the required temperature for one hour. Two sample strips were then immediately placed together under light finger pressure to form an overlapping area of 1×1 cm. A bond was assessed as satisfactory if the two surfaces in contact coalesced completely over their whole area under these conditions and the bond could only be separated with a marked application of force immediately after it has been formed. The temperatures required for this are shown in Table 1 below.

Test for heat strength

After the ventilation period of 30 minutes, the adhesive surfaces were heated to a temperature of 80° to 85° C. for 4 seconds by radiant heat. The sample strips were then placed together to form an overlapping area of 2.5×2.5 cm. The test samples were pressed together under a pressure of 0.4 MPa for 10 seconds.

To determine the heat strength according to ASTM 816 D, test samples which had been kept at room temperature for 9 days were subjected to a shearing test. In this test, the samples were loaded with a mass of 11 kg. After exposure to a temperature of 40° C. for 20 minutes, the temperature at which the bond failed was determined by raising the temperature by 0.25 deg. Cent. per minute. The temperatures reached are also entered in Table 1.

EXAMPLE 1

Starting materials:
337.50 g of an adipic acid-tetramethylenediol polyester (OH number 50) (PE)
1.34 g of dimethylolpropionic acid (DMPA)
26.87 g of 1,6-diisocyanatohexane (H)
17.76 g of IPDI
800.00 g of acetone
14.04 g of sodium salt of N-(2-aminoethyl)-2-aminoethane sulphonic acid (45% in water) (AAS salt)
0.78 g of ethylene diamine (ADA)
557.00 g of water.
NCO/OH ratio for the preparation of the prepolymers: 1.5:1
NCO/NH ratio for the chain lengthening reaction: 1:0.7
Method:
The polyester is dehydrated in a vacuum at 120° C. for 30 minutes with stirring and cooled to 85° C. DMPA is stirred in and H and IPDI are added after 5 minutes. Stirring is continued at 85° C. until the isocyanate value remains constant at 1.58%. Acetone is slowly added while the temperature is maintained at 50° C. The isocyanate value of the acetonic solution is 0.47%. A solution of AAS and ADA in 28 g of water is stirred into the homogeneous acetonic solution at 50° C. After 5 minutes, the product is dispersed with water and the acetone is then immediately distilled off.
A finely divided dispersion having a solids content of 42.9%, a Ford cup viscosity (4 mm nozzle) of 13.8 sec. and a pH of 5.5 is obtained.

COMPARISON EXAMPLE 1a

Starting materials:
337.50 g of an adipic acid-tetramethylenediol polyester (OH number 50) (PE)
1.34 g of dimethylolpropionic acid (DMPA)
13.92 g of tolylene diisocyanate, 2,4-/2,6-isomers (ratio by weight =65:35, (T65))
35.52 g of IPDI
800.00 g of acetone
16.04 g of the sodium salt of N-(2-aminoethyl)-2-aminoethane sulphonic acid (45% in water) (AAS salt)
0.85 g of ethylenediamine (ADA)
540.00 g of water
NCO/OH ratio: 1.5:1
NCO/NH ratio: 1:0.7 (based on the NCO value found)
Method:
See Example 1
A finely divided dispersion having a solids content of 41.4%, a Ford cup viscosity (4 mm nozzle) of 13.8 sec and a pH of 5 is obtained.

COMPARISON EXAMPLE 1b

Starting materials:
337.50 g of an adipic acid-tetramethylenediol polyester (OH number 50) (PE)
1.34 g of dimethylolpropionic acid (DMPA)
27.84 g of tolylene diisocyanate 2,4-/2,6-isomers (65:35, T65)
17.76 g of 1,6-diisocyanatohexane (H)
800.00 g of acetone
16.04 g of the sodium salt of N-(2-aminoethyl)-2-aminoethane sulphonic acid (45% in water) (AAS salt)
1.12 g of ethylenediamine (ADA)
520.00 g of water
NCO/OH ratio: 1.66:1
NCO/NH ratio: 1:0.7 (based on the NCO value found).
Method:
See Example 1
A finely divided dispersion having a solids content of 40%, a Ford cup viscosity (4 mm nozzle) of 13.9 sec and a pH of 5 is obtained.

COMPARISON EXAMPLE 1c

Starting materials:
337.50 g of an adipic acid-tetramethylenediol polyester (OH number 50) (PE)
1.34 g of dimethylolpropionic acid (DMPA)
53.28 g of IPDI
1027.00 g of acetone
20.68 g of the sodium salt of N-(2-aminoethyl)-2-aminoethane sulphonic acid (45% in water) (AAS salt)
0.60 g of ethylenediamine (ADA)
600.00 g of water
NCO/OH ratio: 1.5:1
NCO/NH ratio : 1:0.8 (based on the NCO value found)
Method:
see Example 1
A finely divided dispersion having a solids content of 41.9%, a Ford cup viscosity (4 mm nozzle) of 12.8 sec and a pH of 5 is obtained.

COMPARISON EXAMPLE 1d

Starting materials:
337.50 g of an adipic acid-tetramethylenediol polyester (OH number 50) (PE)
1.34 g of dimethylolpropionic acid (DMPA)
40.32 g of 1,6-diisocyanatohexane (H)
1100.00 g of acetone
18.83 g of the sodium salt of N-(2-aminoethyl)-2-aminoethane sulphonic acid (45% in water) (AAS salt)
0.64 g of ethylenediamine (ADA)
560.00 g of water
NCO/OH ratio: 1.5:1
NCO/NH ratio: 1:0.8(based on the NCO value found)
Method:
see Example 1
A finely divided dispersion having a solids content of 42.4%, a Ford cup viscosity (4 mm nozzle) of 13.7 sec and a pH of 5 is obtained.

COMPARISON EXAMPLE 1e

Starting materials:
337.50 g of an adipic acid-tetramethylenediol polyester (OH number 50) (PE)
1.34 g of dimethylolpropionic acid (DMPA)
41.76 g of tolylene diisocyanate 2,4-/2,6-isomers (65:35, T65)
1100.00 g of acetone 15.62 g of the sodium salt of N-(2-aminoethyl)-2-aminoethane sulphonic acid (45% in water) (AAS salt)
1.14 g of ethylenediamine (ADA)
540.00 g of water
NCO/OH ratio: 1.5:1
NCO/NH ratio: 1:0.7 (based on the NCO value found)
Method:
See Example 1
A dispersion having a solids content of 42.4%, a Ford cup viscosity (4 mm nozzle) of 13.7 sec and a pH of 5 is obtained.

COMPARISON EXAMPLE 1f

Example 1 of DE-OS No. 2,651,506 is repeated. The aqueous dispersion obtained, which has a solids content of 50%, is tested for its adhesive properties (see Table 1).

EXAMPLE 2

Starting materials:
337.50 g of an adipic acid-tetramethylenediol polyester (OH number 50) (PE)
2.03 g of dimethylolpropionic acid (DMPA)
25.09 g of 1,6-diisocyanatohexane (H)
16.54 g of IPDI
835.00 g of acetone
18.17 g of the sodium salt of N-(2-aminoethyl)-2-aminoethane sulphonic acid 45% in water) (AAS salt)
1.58 g of triethylamine (TEA)
619.00 g of water
NCO/OH ratio: 1.35:1
NCO/NH ratio: 1:0.83 (based on the NCO value found)
Method:
The prepolymer is prepared as in Example 1 and dissolved in acetone. The product is lengthened with AAS at 50° C. and converted into a salt by reaction with TEA after 5 minutes and then dispersed in water after a further 5 minutes. The acetone is distilled off immediately thereafter. A finely divided dispersion having a solids content of 41.7%, a Ford cup viscosity (4 mm nozzle) of 20.8 sec and a pH of 6 is obtained.

EXAMPLE 3

Starting materials:
337.50 g of an adipic acid-tetramethylenediol polyester (OH number 50) (PE)
1.34 g of dimethylolpropionic acid (DMPA)
36.29 g of 1,6-diisocyanatohexane (H)
5.33 g of IPDI
800.00 g of acetone
19.00 g of the sodium salt of N-(2-aminoethanol)-2-aminoethanesulphonic acid (45% in water) (AAS salt)
0.50 g of ethylenediamine (ADA)
580.00 g of water
NCO/OH ratio: 1.5:1
NCO/NH ratio: 1:0.8 (based on NCO value found)
Method:
See Example 1
A finely divided dispersion having a solids content of 45.7%, a Ford cup viscosity (4 mm nozzle) of 22.3% and a pH of 6 is obtained.

EXAMPLE 4

Starting materials:
337.50 g of an adipic acid-tetramethylenediol polyester (OH number 50) (PE)
1.34 g of dimethylolpropionic acid (DMPA)
4.03 g of hexamethylenediisocyanate (H)
47.95 g of IPDI
800.00 g of acetone
13.17 g of the sodium salt of N-(2-aminoethyl)-2-aminoethanesulphonic acid (45% in water) (AAS salt)
0.36 g of ethylenediamine (ADA)
540.00 g of water
NCO/OH ratio: 1.5:1
NCO/NH ratio: 1:0.8
Method:
See Example 1
A finely divided dispersion having a solids content of 41%, a Ford cup viscosity (4 mm nozzle) of 12.4 sec and a pH of 6 is obtained.

The invention is further illustrated, but is not intended to be limited by the following examples in which all parts and percentages are by weight unless otherwise specified.

TABLE 1

| Example | Isocyanate | Polyester Type* | Mol % | Activating Temperature | Film Formation | Heat Resistance |
|---|---|---|---|---|---|---|
| 1 | H/IPDI | I | 66/34 | 45° C. | homogeneous | 80.5° C. |
| 1a | T/IPDI | I | 34/66 | 60° C. | homogeneous | 89.5° C. |
| 1b | H/T | I | 34/66 | 60° C. | inhomogeneous | 78.0° C. |
| 1c | IPDI | I | 100 | 65° C. | homogeneous | 63.5° C. |
| 1d | H | I | 100 | 45° C. | inhomogeneous | 75.0° C. |
| 1e | T | I | 100 | 65° C. | homogeneous | 60.0° C. |
| 1f | H/IPDI | II | 50/50 | >80° C. | homogeneous | <40.0° C. |
| 2 | H/IPDI | I | 66/34 | 40° C. | homogeneous | 89.5° C. |
| 3 | H/IPDI | I | 90/10 | 40° C. | homogeneous | 79.5° C. |
| 4 | H/IPDI | I | 10/90 | 45° C. | homogeneous | 90.0° C. |

*I = adipic acid-tetramethylenediol polyester
II = adipic acid-hexamethylenediol-2,2-dimethylpropanediol-1,3-polyester Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An adhesive comprising an aqueous solution of a dispersion of a polyurethane which contain 2 to 200 milliequivalents of chemically incorporated carboxylate or sulphonate groups per 100 g of solids content, which polyurethane is virtually free from built in ethylene oxide units situated in polyether end chains or side chains based on (a) organic diisocyanates mixture consisting of 1,6-diisocyanathohexane and 1-isocyanato-3,3,5-trimethyl-5-isocyanatomethyl-cyclohexane, (b) organic dihydroxyl compounds in the molecular weight range of from 400 to 10,000, (c) 0 to 40 equivalent percent, based on the total quantity of components (b) and (c) of polyhydric alcohols and/or amino alcohols in the molecular weight range of from 62 to 339, and (d) aminic or hydrazinic chain lengthening agents in the molecular weight range of from 32 to 400 having at least two amino groups, characterized in that the diisocyanates are present each in a quantity of at least 10 mol-%, based on the total quantity of the diisocyanates, and in that component (b) consists essentially of polyester diols based on (i) adipic acid and (ii) tetramethylene diol, hexamethylenediol or mixture of these diols.

2. A method of use of aqueous solution or dispersion of a polyurethane consisting from 2 to 200 milliequivalents of chemically incorporated carboxylate and/or sulphonate groups per 100 g of solids content, which polyurethane is virtually free form built in ethylene oxide units situated in polyether end chains or side chains and is the prepolymer reaction product of (a) organic diisocyanates mixture consisting of 1,6-diisocyanatohexane and 1-isocyanato-3,3,5-5-trimethyl-5-isocyanateomethyl-cyclohexane, with (b) organic polyhydroxyl compound in the molecular weight range of from 400 to 10,000 and (c) 0 to 40 equivalent based on the total quantity of components (b) and (c) of a polyhydric alcohol and/or amino alcohol in the molecular weight range of from 62 to 399, at an NCO/OH equivalent ratio of from 1.2:1 to 2.5:1, said reaction having been followed by chain lengthening of the resulting prepolymer containing isocyanate groups with (d) aminic or hydrazinic chain lengthening agent having at least two amino groups as an adhesive for the formation of bonds between two substrates characterized in that said diisocyanates are each present in an amount of at least 10 mol-%, based on the total quantity of component (a), and that the organic polyhydroxyl compound consists essentially of a polyester diol of (i) adipic acid and (ii) tetramethylenediol, hexamethylenediol or a mixture of these diols.

* * * * *